(12) United States Patent
Fokkelman

(10) Patent No.: US 8,561,387 B2
(45) Date of Patent: Oct. 22, 2013

(54) METHOD FOR CHECKING THE SEAL OF A REAGENT INJECTOR

(75) Inventor: Joris Fokkelman, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 616 days.

(21) Appl. No.: 12/556,780

(22) Filed: Sep. 10, 2009

(65) Prior Publication Data

US 2010/0064664 A1    Mar. 18, 2010

(30) Foreign Application Priority Data

Sep. 18, 2008  (DE) .................. 10 2008 047 860

(51) Int. Cl.
*F01N 3/00*    (2006.01)

(52) U.S. Cl.
USPC ......................... 60/276; 60/274; 60/277

(58) Field of Classification Search
USPC ................. 60/274, 277, 286, 301, 311
See application file for complete search history.

(56) References Cited

U.S. PATENT DOCUMENTS

| | | | |
|---|---|---|---|
| 5,782,086 A * | 7/1998 | Kato et al. | 60/274 |
| 6,393,833 B2 | 5/2002 | Mizoguchi | |
| 6,487,852 B1 * | 12/2002 | Murphy et al. | 60/286 |
| 7,028,465 B2 | 4/2006 | Ripper et al. | |
| 7,428,809 B2 | 9/2008 | Wickert et al. | |
| 7,543,443 B2 * | 6/2009 | Tsumagari | 60/277 |
| 7,997,070 B2 * | 8/2011 | Yasui et al. | 60/295 |
| 2001/0013222 A1 | 8/2001 | Mizoguchi | |
| 2003/0051468 A1 * | 3/2003 | Van Nieuwstadt et al. | 60/286 |
| 2004/0055284 A1 | 3/2004 | Ripper et al. | |
| 2006/0080952 A1 | 4/2006 | Wickert et al. | |
| 2006/0283178 A1 * | 12/2006 | Akagawa | 60/286 |
| 2007/0209349 A1 * | 9/2007 | Ripper et al. | 60/286 |

FOREIGN PATENT DOCUMENTS

| | | |
|---|---|---|
| DE | 10106839 A1 | 8/2001 |
| DE | 10100420 A1 | 7/2002 |
| DE | 102004018221 A1 | 11/2005 |
| DE | 102004046639 A1 | 3/2006 |
| DE | 102006026739 A1 | 1/2008 |

OTHER PUBLICATIONS

German Office Action, German application No. 10 2008 047 860.1-26, 3 pages, Mar. 25, 2009.

* cited by examiner

*Primary Examiner* — Thomas Denion
*Assistant Examiner* — Matthew T Largi
(74) *Attorney, Agent, or Firm* — King & Spalding L.L.P.

(57) ABSTRACT

In a method for checking the seal of a reducing agent injector of an SCR exhaust gas aftertreatment system of an internal combustion engine comprising at least one reducing agent tank, a reducing agent pump, a reducing agent injector and an NOx sensor connected downstream from the SCR catalytic converter, the following steps are carried out: a) Generation and/or detection of a release state of the SCR system in which no reducing agent is stored in the SCR catalytic converter; b) Determining a setpoint NOx value in the exhaust gas; c) Starting the seal check with a closed reducing agent injector by increasing the reducing agent pressure; d) Detecting the NOx signal at the NOx sensor, and a) Evaluating the NOx signal.

17 Claims, 1 Drawing Sheet

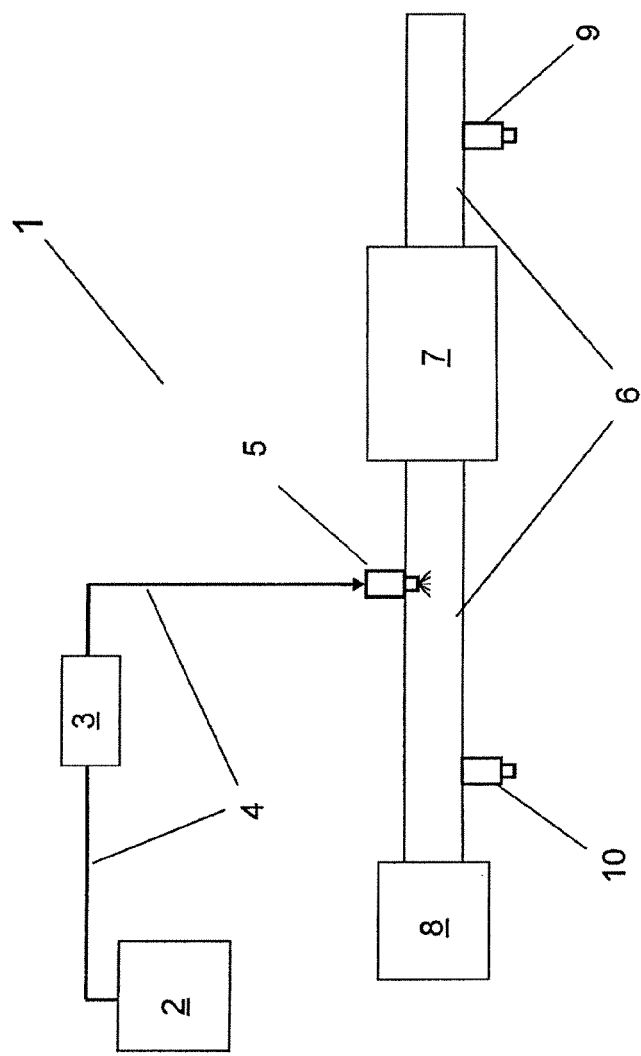

METHOD FOR CHECKING THE SEAL OF A REAGENT INJECTOR

CROSS-REFERENCE TO RELATED APPLICATIONS

This application claims priority to DE Patent Application No. 10 2008 047 860.1 filed Sep. 18, 2008, the contents of which is incorporated herein by reference in its entirety.

TECHNICAL FIELD

The invention relates to a method for checking the seal of a reagent injector, especially of a reducing agent injector of an SCR exhaust gas aftertreatment system of an internal combustion engine.

BACKGROUND

There are various established methods for reduction of pollutants, especially for reduction of nitric oxides, in which reducing fluids (gases or liquids) are introduced into the exhaust gas system of an internal combustion engine.

SCR technology in particular has established itself as a method of reducing nitric oxide, in which nitric oxide (NOx) contained in the nitrogen-rich exhaust is selectively reduced to nitrogen and water with the aid of ammonia or a corresponding precursor substance able to be converted into ammonia. Preferably this method is based on aqueous urea solutions. The urea solution is hydrolyzed by means of hydrolysis catalytic converters or directly at the SCR converter into ammonia and carbon dioxide. For this purpose the urea solution is injected by means of specific dosing systems upstream from the hydrolytic catalytic converter or the SCR catalytic converter into the exhaust gas stream. The problem here is to guarantee the secure supply and exact dosing of the reducing agent.

With an underdosing of the reducing agent an efficient removal of nitric oxide (NOx) from the exhaust gas cannot be achieved. An overdosing of reducing agent on the other hand can result in an undesired emission, of ammonia for example, a so-called reducing agent breakthrough.

In order to achieve a maximum conversion rate of the nitric oxide (NOx) an exact and demand-related dosing of the reducing agent is necessary, with a reducing agent breakthrough being avoided if at all possible.

With fluid reducing agents such as the widely-used urea solutions, the dosing can be undertaken using an injector. The activation time and thereby the opening time of the injector in this case are decisive for the quantity of reducing agent supplied to the exhaust gas aftertreatment system.

Ever greater injection pressures are used with modern airless SCR systems. To create the appropriate pressure the injector is connected via a line to a reducing agent pump. A high injection pressure has the advantage that the vaporization is finer and thus the ammonia can be more easily released from the mostly aqueous reducing agent solution. The ever higher pressure on the other hand means that there is an increasing danger of a leak arising at the injector and leading to an undesirably high dosing of reducing agent.

In addition, the function of the reducing agent injector means that it opens out into the exhaust and is thus subjected to the unfavorable operating conditions, such as for example the high temperatures, of the exhaust gas system. This can likewise lead to sealing problems with the injector through ageing during the service life of the dosing system.

DE 101 00 420 A1 describes a method for controlling an exhaust gas aftertreatment system for an internal combustion engine, in which a predeterminable quantity of reducing agent is supplied depending on the state of the internal combustion engine or of the exhaust gas aftertreatment system. The quantity of supplied reducing agent in this case is varied depending on the detection of an overdosing or underdosing of the reducing agent in relation to the nitric oxide throughput of the SCR catalytic converter. The method is expensive and dependent on a large number of parameters both of the internal combustion engine and also of the overall exhaust gas aftertreatment system. Manufacturing tolerances, functional changes, malfunctions or leaks in the reducing agent dosing system are not take into account here however.

The same also applies to the method for operating an internal combustion engine in accordance with DE 10 2004 046 639 A1. In this method an NOx sensor arranged downstream from the catalytic converter, which has a cross sensitivity in relation to the reagent material, interrogates a signal for predetermined operating states of the internal combustion engine which is evaluated as a measure of the reagent material slippage. However this only detects a state in which a slippage of the reagent behind the catalytic converter has already occurred. This slippage is however highly undesirable.

A method is known from DE 10 2004 018 221 A1 with which sealing problems in the entire high pressure section of the SCR system can be determined. However with this method it is not possible to trace the problem to a specific component, such as the reducing agent injector. It can thus only be established that the overall high-pressure SCR system has a sealing problem and must be completely replaced in order to rectify the problem. This is especially disadvantageous since a number of components make up the high-pressure SCR system which are distributed between a number of locations in the motor vehicle. Thus the reducing agent pump is mostly in the vicinity of the reducing agent tank, which for its part, because of the need to refill with reducing agent, must be able to be reached from outside the motor vehicle. The reducing agent injector is as a rule, to protect it from heat, not located in the vicinity of the engine and can even be arranged after any particle filter which might be present. In addition, for the purposes of pressure equalization, the high-pressure SCR system can have return lines from the reducing agent injector to the reducing agent tank. The complete removal and replacement of such an SCR system is extremely complicated and cost intensive.

SUMMARY

According to various embodiments, a simple and low-cost method for checking the sealing of a reaction material injector in an SCR exhaust gas aftertreatment system of an internal combustion engine can be created.

According to an embodiment, a method for checking the seal of a reducing agent injector of an SCR exhaust gas aftertreatment system of an internal combustion engine comprising a least one reducing agent tank, a reducing agent pump, a reducing agent injector and an NOx sensor connected downstream from the SCR catalytic converter, may comprise the steps of: a) Generating and/or detecting a release state of the SCR system in which no reducing agent is stored in the SCR catalytic converter, b) Determining a setpoint NOx value in the exhaust gas, c) Starting the seal check with a closed reducing agent injector by increasing the reducing agent pressure, d) Detecting the NOx signal at the NOx sensor, and e) Evaluating the NOx signal.

According to a further embodiment, the release state can be generated by a regeneration of a particle filter in the exhaust gas system. According to a further embodiment, the release state can be generated and/or detected by an ongoing high-load operation of the internal combustion engine. According to a further embodiment, the release state can be detected by the detection and evaluation of the exhaust gas temperature. According to a further embodiment, the setpoint NOx value can be determined in step b) by an NOx model and/or by a second NOx sensor connected upstream from the SCR catalytic converter and a reducing agent injector. According to a further embodiment, the NOx value can be defined from the NOx model by a constant operating point of the internal combustion engine. According to a further embodiment, the reducing agent pressure can be set in step c) to a value of 8 to 11 bar. According to a further embodiment, the NOx signal can be evaluated in step e) in an evaluation unit. According to a further embodiment, the result of the evaluation of the NOx signal can be transferred in step e) to an information and/or display device. According to a further embodiment, the method can be initiated at regular intervals and or at intervals dependent on the operating time of the internal combustion engine.

According to another embodiment, a facility for performing the above mentioned method may comprise means for controlling and increasing a reducing agent pressure and means for evaluating an NOx signal.

According to yet another embodiment, an exhaust gas aftertreatment system may comprise a facility as mentioned above.

According to a further embodiment, the exhaust gas aftertreatment system can be coupled to on-board diagnostics.

BRIEF DESCRIPTION OF THE DRAWINGS

The invention will be explained below by way of example in conjunction with the drawing, without being restricted in any way to this embodiment.

The figures show:

FIG. 1 a schematic representation of a facility for executing a method according to various embodiments for checking the seal of a reducing agent injector.

DETAILED DESCRIPTION

According to various embodiments, a method for checking the sealing of a reduction material injector of an SCR exhaust gas aftertreatment system of an internal combustion engine comprising at least one reducing agent tank, a reducing agent pump, a reducing agent injector and an NOx sensor connected downstream from the SCR catalytic converter, may carry out the following steps:
a) Generation and/or detection of a release state of the SCR system, in which no reducing agent is stored in the SCR catalytic converter,
b) Determining a setpoint NOx value in the exhaust gas,
c) Starting the seal check with a closed reducing agent injector by increasing the reducing agent pressure,
d) Detecting the NOx signal at the NOx sensor and
a) Evaluating the NOx signal.

Ammonia or a precursor compound of ammonia can preferably be used as the reducing agent. A 32.5% aqueous urea solution, known throughout the industry as "Adblue" and the composition of which is regulated in DIN 70070, has proven to be particularly effective in such cases.

The various embodiments define the release state of the SCR system as being a state in which it is ensured that no reducing agent is stored in the SCR catalytic converter. These also includes no reducing agent from previous reducing agent deposits being able to be released.

In addition, in step b) an NOx value will be determined in the exhaust gas so that if necessary a deviation of the NOx value recorded at the NOx sensor from the setpoint NOx value can be detected later. In accordance with various embodiments, determining the setpoint NOx value is thus to be understood as the NOx value also being present during the seal checking and/or being able to be determined.

In step c) of the method according to various embodiments the reducing agent pressure can be set higher than the reducing agent pressure in normal catalytic converter operation. In normal catalytic converter operation pressures of 5 to 8 bar are currently normal. The seal checking can then for example be carried out at 8 to 11 bar.

With the selected higher pressure during the seal checking the stress on the system can advantageously be increased so than an injector leak can be detected earlier and/or more clearly. The increase in the pressure can be initiated by an activation signal from a controller, for example the engine controller, a reducing agent pump controller, exhaust system controller or a separate controller for the seal checking process.

According to various embodiments there is provision for the increased reducing agent pressure to be maintained at least over one period which makes it possible to be able to establish any change to the NOx signal which might have occurred.

If a reduction in the NOx value occurs during the seal checking under these preconditions and the value deviates from the previously defined setpoint NOx value which was detected at the NOX sensor in step d), the conclusion that can be drawn in the evaluation step e) is that the reducing agent necessary for this with the reducing agent injector kept closed can only result from a leakage of the said injector. If no reduction of the NOx value is established, it can be assumed that the reducing agent injector is free from leaks.

Advantageously with the method according to various embodiments a specific diagnosis can be made with means of an SCR system, which are already present or only slightly modified, as to whether the reducing agent injector has a leak. If the injector is actually leaky then it is possible during a repair to just replace this and not all system parts at which high pressure is present. In this way the removal and installation time can be shortened and also cost savings can be made for the spare parts.

A further advantage is that the reducing agent injector can be checked and diagnosed individually and as a system component as is required for on-board diagnostics. The method according to various embodiments can thus be employed for example as part of on-board diagnostics in a motor vehicle. In this case there can be provision for the method to be initiated at regular intervals or at intervals which depend on the operating time of the internal combustion engine and of the connected SCR system. In a motor vehicle for example a seal check can also be carried out at intervals which depend on the number of kilometers driven. It can equally be possible in addition or as an alternative for the method to be initiated by an operator, for example the driver of a motor vehicle or workshop personnel at an individually selected point in time.

In an embodiment the release state can be generated by the regeneration process of a particle filter in the exhaust system. In accordance with various embodiments it can also be stored in a controller, for example a an engine controller, which follows a particle filter regeneration following on from a seal check of the reducing agent injector, so that the seal check can be initiated automatically.

Equally preferably the generation and/or detection of the release state can be achieved by an ongoing high-load operation of the internal combustion engine. This can ensure that no more reducing agent is stored in the catalytic converter or can be released.

In a further embodiment of the method the release state can be recognized by the detection and evaluation of the temperature of the exhaust gas.

The temperature of the exhaust gas can be determined for example from known operating variables of the engine. An exhaust gas temperature sensor for detecting the exhaust gas temperature can also typically be provided for this purpose however. If the exhaust gas temperature has exceeded a previously defined and determined threshold value for a specific period, the seal check can be started for the given a setpoint NOx value. The temperature is able to be measured in a simple, reliable and low-cost manner.

In addition the method according to various embodiments can be adapted with the variants described here advantageously to the respective type of internal combustion engine and for example to the specific requirements of the different internal combustion engine types and/or the most favorable methodology selected in each case.

According to a methodology in accordance with various embodiments of the method, there is provision for the setpoint NOx value in step b) to be determined by an NOx model and/or by a second NOx sensor connected upstream from the SCR catalytic converter and the reducing agent injector. Determination using modeling is preferred since advantageously no additional sensor is necessary.

It is further preferable for the NOx value to be able to be defined from the NOx model by a constant engine operating point. This engine operating point can for example be produced from the talk, rotational speed and/or the temperature of the internal combustion engine than the resulting setpoint NOx value can be modeled from this.

The NOx signal can preferably be evaluated in step e) in an evaluation unit which can be integrated into a controller, preferably an engine controller. In an embodiment the result of the seal check can be transferred to an information and/or display device. This can for example be a display in the cockpit of the motor vehicle or the result can be stored in an on-board computer as a diagnostic value.

In an alternate embodiment of the method, in step d) as an alternative or in addition, a reducing agent signal can be generated by a reducing agent-sensitive sensor and accordingly in step e) the reducing agent signal can be evaluated which is arranged in the exhaust gas system behind the reducing agent injector. In the case in which initially a precursor substance of the reducing agent is supplied this is to be understood as a position at which a complete conversion to the actual reducing agent has also taken place. For example in the use of a urea solution a complete conversion to ammonia has taken place. In accordance with this specific embodiment of the method with this variant, in the event of an increase or the occurrence of a reducing agent signal with a closed reducing agent sensor it can likewise clearly be concluded that there is a leak in the reducing agent injector.

There can preferably the provision for the reducing agent-sensitive sensor to be a nitric oxide sensor with cross sensitivity to ammonia in the exhaust gas aftertreatment system. Advantageously this enables the same sensor or sensors to fulfill different functions during operation and no additional sensor for the detection of ammonia as reducing agent in the overall system has to be planned in and integrated.

The invention further relates to a facility for executing the method, with said method comprising means for controlling and increasing the reducing agent pressure and means for detecting and evaluating the NOx signal. The reducing agent pressure can typically be regulated by a reducing agent pump controller. An appropriate pressure sensor can additionally be employed to check the reducing agent pressure.

In an embodiment the facility is an exhaust gas aftertreatment system of an internal combustion engine or is used in this. The facility can be especially preferably be coupled to on-board diagnostics.

FIG. 1 shows a schematic diagram of an SCR exhaust gas aftertreatment facility 1 for carrying out the method according to various embodiments. This comprises a reducing agent tank 2, which is linked by a reducing agent line 4 to a reducing agent injector 5. To generate the required reducing agent pressure, a reducing agent pump 3 is provided in the line 4 between the reducing agent tank 2 and the injector 5. The pressure of the reducing agent can be brought up to a predetermined reducing agent pressure setpoint value by defining a reducing agent pump activation signal. The reducing agent injector 5 is arranged in the exhaust gas system 6 upstream from the SCR catalytic converter 7. The reducing agent injector 5 opens as a result of its function into the exhaust, in order to dose reducing agent into the exhaust gas system 6. The internal combustion engine 8 can be an engine of a motor vehicle for example. This generates exhaust during operation which is directed by the exhaust gas system 6 to the SCR catalytic converter 7. An NOx sensor 9 for detecting the concentration of NOx in the exhaust gas is connected downstream from the SCR catalytic converter 7. Advantageously with the aid of the method according to various embodiments, with these already available and only slightly modified means of an SCR system, a specific diagnosis can be undertaken as to whether the reducing agent injector has a leak. The injector 5 can thus advantageously be individually checked and diagnosed. If the injector 5 is actually leaking then it is possible during a repair to just replace this and not all parts of the system. The method according to various embodiments in this case comprises the following steps:

a) Generation and/or detection of a release state of the SCR system in which no reducing agent is stored in the SCR catalytic converter
b) Determining a setpoint NOx value in the exhaust gas
c) Starting the seal check with a closed reducing agent injector by increasing the reducing agent pressure
d) Detecting the NOx signal at the NOx sensor and
e) Evaluating the NOx signal In this case the evaluation of the NOx signal comprises checking whether the NOx value detected in step d) matches the setpoint NOx value determined in step b). If a reduction in the NOx value is established in accordance with various embodiments a sealing problem in the reducing agent injector 5 can be concluded.

In the embodiment shown a second NOx sensor 10 connected upstream from the SCR catalytic converter 7 and the reducing agent injector 5 is arranged in the exhaust train 6. Preferably the setpoint NOx value is however determined in step b) with the aid of a model. Thus the NOx concentration (setpoint NOx value) can advantageously be determined precisely in the exhaust before the SCR catalytic converter 7 without a second NOx sensor being necessary. Before and during the seal checking the setpoint NOx value is known and a change can be detected by the NOx sensor 9 connected downstream from the SCR catalytic converter.

In summary a method for checking that the seal of a reducing agent injector is accordingly provided with which, using existing and only slightly modified means of the SCR system, a reliable seal check of the reducing agent injector can be undertaken. Thus the reducing agent injector can be checked and diagnosed individually as a system component as is required for on-board diagnostics. The method according to various embodiments can thus typically be used as part of an on-board diagnostics system in a motor vehicle.

What is claimed is:

1. A method for checking the seal of a reducing agent injector of an SCR exhaust gas aftertreatment system of an internal combustion engine comprising a least one reducing agent tank, a reducing agent pump, a reducing agent injector and an NOx sensor connected downstream from the SCR catalytic converter, the method comprising the steps of:
   a) generating and/or detecting a release state of the SCR system in which no reducing agent is stored in the SCR catalytic converter,
   b) determining a setpoint NOx value in the exhaust gas using either a computer model or an additional NOx sensor,
   c) maintaining the reducing agent injector in a closed position while increasing the reducing agent pressure to a pressure higher than a pressure range of the reducing agent pressure during a normal operation of the SCR exhaust gas aftertreatment system,
   d) detecting an NOx signal at the NOx sensor,
   e) evaluating the NOx signal by:
      detecting changes in the NOx signal detected at the NOx sensor,
      comparing the NOx signal detected at the NOx sensor to the setpoint NOx value, and
      identifying a leak in the seal of the reducing agent injector if (a) the NOx signal detected at the NOx sensor indicates a reduction in NOx value over time, and (b) the NOx signal detected at the NOx sensor deviates from the setpoint NOx value.

2. The method according to claim 1, comprising generating the release state by regenerating a particle filter in the exhaust gas system.

3. The method according to claim 1, comprising generating and/or detecting the release state is achieved by an ongoing high-load operation of the internal combustion engine.

4. The method according to claim 1, wherein the release state is detected by the detection and evaluation of the exhaust gas temperature.

5. The method according to claim 1, wherein the setpoint NOx value is determined in step b) by an NOx model and/or by a second NOx sensor connected upstream from the SCR catalytic converter and a reducing agent injector.

6. The method according to claim 1, wherein the NOx value is defined from the NOx model by a constant operating point of the internal combustion engine.

7. The method according to claim 1, wherein the reducing agent pressure is set in step c) to a value of 8 to 11 bar.

8. The method according to claim 1, wherein the NOx signal is evaluated in step e) in an engine controller.

9. The method according to claim 1, wherein the result of the evaluation of the NOx signal is transferred in step e) to a display device.

10. The method according to claim 1, wherein the method is initiated at regular intervals and or at intervals dependent on the operating time of the internal combustion engine.

11. A facility for checking the seal of a reducing agent injector of an SCR exhaust gas aftertreatment system of an internal combustion engine comprising a least one reducing agent tank, a reducing agent pump, a reducing agent injector, an NOx sensor connected downstream from the SCR catalytic converter, means for controlling and increasing a reducing agent pressure and means for evaluating an NOx signal, wherein the facility is operable to:
   a) generate and/or detect a release state of the SCR system in which no reducing agent is stored in the SCR catalytic converter,
   b) determine a setpoint NOx value in the exhaust gas using either a computer model or an additional NOx sensor,
   c) maintain the reducing agent injector in a closed position while increasing the reducing agent pressure to a pressure higher than a pressure range of the reducing agent pressure during a normal operation of the SCR exhaust gas aftertreatment system,
   d) detect an NOx signal at the NOx sensor,
   e) evaluate the NOx signal by:
      detecting changes in the NOx signal detected at the NOx sensor,
      comparing the NOx signal detected at the NOx sensor to the setpoint NOx value, and
      identifying a leak in the seal of the reducing agent injector if (a) the NOx signal detected at the NOx sensor indicates a reduction in NOx value over time, and (b) the NOx signal detected at the NOx sensor deviates from the setpoint NOx value.

12. The facility according to claim 11, comprising generating the release state by regenerating a particle filter in the exhaust gas system.

13. The facility according to claim 11, comprising generating and/or detecting the release state during an ongoing high-load operation of the internal combustion engine.

14. The facility according to claim 11, wherein the release state is detected by the detection and evaluation of the exhaust gas temperature.

15. The facility according to claim 11, wherein the NOx value is defined from the NOx model by a constant operating point of the internal combustion engine.

16. An exhaust gas aftertreatment system comprising a facility according to claim 11.

17. The exhaust gas aftertreatment system according to claim 16, wherein the exhaust gas aftertreatment system is coupled to on-board diagnostics.

* * * * *